United States Patent [19]

Wysocki et al.

[11] Patent Number: 5,339,380
[45] Date of Patent: Aug. 16, 1994

[54] OPTICAL FIBER LASER FUSION SPLICER

[75] Inventors: Joseph A. Wysocki, Oxnard; Michael R. Vince, Thousand Oaks; Stephen W. McCahon, Newbury Park; John T. Kenna, Thousand Oaks, all of Calif.

[73] Assignee: Hughes Aircraft Company, Los Angeles, Calif.

[21] Appl. No.: 155,609

[22] Filed: Nov. 19, 1993

Related U.S. Application Data

[62] Division of Ser. No. 904,249, Jun. 25, 1992.

[51] Int. Cl.$^5$ .......................... G02B 6/00; G02B 6/36
[52] U.S. Cl. ..................................... 385/136; 385/137
[58] Field of Search ................... 385/136, 137, 147; 174/50

[56] References Cited

U.S. PATENT DOCUMENTS

| | | | |
|---|---|---|---|
| 4,263,495 | 4/1981 | Fujita et al. | 219/121 LD |
| 4,802,729 | 2/1989 | Rivoallan et al. | 385/97 |
| 4,911,517 | 3/1990 | Newell et al. | 385/136 |
| 4,954,152 | 9/1990 | Hsu et al. | 65/3.1 |
| 4,971,418 | 11/1990 | Dorsey et al. | 385/96 |
| 4,978,201 | 12/1990 | Yamada et al. | 385/96 |
| 5,009,513 | 4/1991 | Onodera et al. | 374/31 |
| 5,013,345 | 5/1991 | Itoh et al. | 65/4.2 |
| 5,016,971 | 5/1991 | Hsu et al. | 65/3.1 |
| 5,161,207 | 11/1992 | Pikulski | 385/96 |
| 5,214,735 | 5/1993 | Henneberger et al. | 385/136 |

*Primary Examiner*—Akm E. Ullah
*Attorney, Agent, or Firm*—V. D. Duraiswamy; W. K. Denson-Low

[57] ABSTRACT

An optical fiber fusion splicer apparatus (20) comprises a laser power source that produces a laser beam (32) having a laser beam axis (26). The laser power source includes a laser (22), a shutter (28) that controllably blocks and passes the laser beam, and an optical system (30) that expands the diameter of the laser beam. A parabolic mirror (34) has its axis coincident with the laser beam axis (26) and a bore (48) therethrough coincident with the laser beam axis (26). Optical fiber clamps (42, 46) hold the two optical fibers (40, 44) with their axes coincident with the laser beam axis (26) and their ends (62, 64) at the focal point (38) of the parabolic mirror (34). A sensor (82) measures the power reaching the optical fiber ends (62, 64) at the focal point (38) of the parabolic mirror (34), and a controller (72) controls the power level of the laser (22) responsive to the power measured by the sensor. The alignment of the optical fibers (40, 44) is sensed, preferably by a reflective device (74) that measures their internal reflectance or a video camera (68) that images their peripheries, and the optical fiber ends (62, 64) are aligned responsively.

5 Claims, 4 Drawing Sheets

OPTICAL FIBER LASER FUSION SPLICER

This is a division of application Ser. No. 07/904,249 filed Jun. 25, 1992 now being allowed.

BACKGROUND OF THE INVENTION

This invention relates to optical fibers, and, more particularly, to the splicing of two lengths of optical fibers to form a single spliced optical fiber.

Optical fibers are strands of glass fiber processed so that light beams transmitted through the glass fiber are subject to total internal reflection. A large fraction of the incident intensity of light directed into the fiber is received at the other end of the fiber, even though the fiber may be hundreds or thousands of meters long. Optical fibers have shown great promise in communications applications, because a high density of information may be carried along the fiber. Also, the quality of the signal is less subject to external interferences of various types than are electrical signals carried on metallic wires. Moreover, the glass fibers are light in weight and made from highly plentiful substances, such as silicon dioxide.

Glass fibers are typically fabricated by preparing a cylindrical preform of glasses of two different optical indices of refraction, with a core of one glass inside a casing of a glass of slightly lower refractive index, and then processing the preform to a fiber by drawing or extruding. The optical fiber is coated with a polymer layer termed a buffer to protect the glass from scratching or other damage. The optical fibers and the buffers may be made with varying dimensions, depending upon their intended use and the manufacturer. As an example of the dimensions, in one configuration the diameter of the glass optical fiber is about 0.002–0.005 inches, and the diameter of the optical fiber plus the buffer layer is about twice the optical fiber diameter.

For some applications the optical fiber must be many kilometers long and must have a high degree of optical perfection and strength over that entire length. Preparation of an optical fiber of that length having no defects is difficult. It is therefore desirable to have the capability to splice two shorter lengths of optical fiber together to form a longer optical fiber. The need to splice optical fibers also arises when it is necessary to use a length longer than can be made from a single preform, when an existing length of fiber breaks, or when apparatus such as an amplifier is to be incorporated into a length of fiber.

The optical fiber splice must be accomplished so that there is no significant increase in loss of light in the vicinity of the splice. The spliced fiber must also have a sufficiently high strength to withstand handling in operations such as winding under tension onto a bobbin, or unwinding from the bobbin at high rates. Additionally, it must be possible to restore the buffer layer initially on the fibers being spliced.

A number of techniques for splicing optical fibers are known in the art. For example, U.S. Pat. No. 4,263,495 depicts the use of a laser to heat and fuse the ends of two opposed optical fibers. In this approach, the laser beam may be directed either perpendicular to the optical fibers, or parallel to the optical fibers and reflected to a focal point by a mirror. As such techniques were applied, they were observed to produce splices that were lacking in strength and reproducibility. As a response, automated optical fiber splicing control systems such as that of U.S. Pat. No. 5,016,971 were developed. The automated approach of U.S. Pat. No. 5,016,971 has significantly improved the ability to splice optical fibers in a reproducible manner. However, there remains the opportunity for improving the strength, optical characteristics, and reproducibility of optical fiber splices.

Therefore, there is a continuing need for an improved method for splicing optical fibers. The improved technique should produce spliced optical fibers of acceptable strength and optical performance, and have the ability to provide a continuous buffer coating over the spliced region. The splicing method should be amenable to accomplishing large numbers of splices in a reproducible manner. The present invention fulfills this need, and further provides related advantages.

SUMMARY OF THE INVENTION

The present invention provides a method and apparatus for grasping and splicing lengths of optical fiber together to form a single spliced length. High quality splices having little loss of light and little loss of strength due to the presence of the splice are produced. Equally importantly, the splicing method and apparatus are automatically controlled and yield highly reproducible results when applied in a setting where large numbers of splices must be made on a routine basis.

In accordance with the invention, an optical fiber fusion splicer comprises means for supporting two optical fibers with their ends in an aligned facing relation along an axis and means for heating the two optical fibers uniformly around their circumferences at their facing ends. The apparatus further includes means for controlling the power input to the means for heating so as to heat the optical fibers at their facing ends with the minimum power sufficient to fuse the facing ends. The combination of precisely positioning the ends of the optical fibers, circumferentially evenly heating the ends being spliced, and utilizing a minimum required power to fuse the optical fibers produces excellent quality and reproducibility of the optical fiber splices.

In one embodiment, the heating source is a laser power source that includes a laser, a shutter that controllably blocks and passes the laser beam, a parabolic mirror whose axis is parallel to the axis of the optical fibers, and an optical system that expands the diameter of the laser beam before it reaches the parabolic mirror. The laser is preferably a carbon dioxide laser whose output power is monitored and used for control purposes. There is also preferably a sensor that measures the power of the beam reaching the optical fiber ends being spliced, such as an optical detector that measures the change in luminescence at the optical fiber ends being spliced. A controller adjusts the beam power responsive to one or both of the sensors. The power level of the laser is determined in a series of calibration tests to be the minimum power required to accomplish the fusion splicing. Once this power level is determined, the same conditions are used in subsequent splices of similar optical fiber lengths.

The means for supporting the optical fibers preferably includes a first optical fiber clamp positioned between the laser and the parabolic mirror, as measured along the beam axis, and a second optical fiber clamp positioned further from the laser than the parabolic mirror, as measured along the laser beam axis. The parabolic mirror includes a bore therethrough coincident with the beam axis. Each of the optical fiber lengths whose ends are to be fused and spliced is supported in one of the optical fiber clamps, coincident with the laser beam axis. The first optical fiber clamp is mounted on a controllable 3-axis manipulator stage that permits the optical fiber end to be spliced to be positioned very precisely relative to the other end, which is held fixed in a location protruding through the bore of the parabolic mirror to the focus of the mirror.

The optical fibers are monitored and positioned responsively using the 3-axis manipulator stage. Two monitoring techniques are used. In one, a video image of the sides of the optical fibers is obtained with a video camera. The image may be viewed on a monitor and the manipulator stage moved responsively. Preferably, the image is processed with pattern recognition techniques to recognize the peripheries of the optical fibers. The stage is automatically moved responsively to align the peripheries prior to splicing. In a second technique, an optical time domain reflectometer is used to measure light reflected from defects and surfaces within the optical fibers. The stage is automatically moved responsively to minimize the reflected light, thus maximizing light transmission.

The present invention also provides a design for the optical fiber clamps that achieves secure clamping and holding of the optical fiber while not stressing the optical fiber. The clamp includes a support base having a slot therein radially dimensioned to conform to the outer buffer surface of the optical fiber, and a retainer that slides into the slot with a lower end dimensioned to conform to the outer buffer surface of the optical fiber. The optical fiber to be held is inserted into the slot, and the retainer is thereafter inserted into the slot to hold the optical fiber securely. The slot is precisely located to the outer surface of the clamp to permit the optical fiber to be positioned exactly and reproducibly. A cooperating clamp holder allows the optical fiber to be moved from place-to-place, and also from apparatus-to-apparatus, while retained within the clamp. Consequently, there is little likelihood that the optical fiber can be damaged while held and moved in the clamp.

After the splicing of the glass optical fibers is complete using the approach of the invention, the spliced optical fibers must be recoated with buffer material. The first important consideration in recoating the now-spliced optical fiber is to move the optical fiber from the laser fusion apparatus to a recoating unit. Experience has shown that the removal of the optical fiber from the clamps and movement to the recoating unit can result in damage to or breakage of the optical fiber in the splice region, inasmuch as it is not protected by a buffer layer at that time. The present invention therefore provides a clamp holder that grasps the two optical fiber clamps and allows them and the spliced optical fiber lengths to be moved as a rigid unit to the recoating apparatus. The result of using this clamp holder, which is also usable in other contexts for moving aligned and/or spliced optical fibers, is substantially improved reliability of the splicing and recoating operation.

The present invention provides an important advance in the art of optical fiber splicing technology. The approach is highly controllable and reproducible, because the pre-fusion alignment and laser fusion operations are controlled responsive to automated measurements of the apparatus. The controller, not an operator, determines the alignment and fusion conditions, and the coaxial design ensures circumferentially even heating of the optical fiber ends as they are fused. Other features and advantages of the invention will be apparent from the following more detailed description of the invention, taken in conjunction with the accompanying drawings, which illustrate, by way of example, the principles of the invention.

DETAILED DESCRIPTION OF THE INVENTION

Figure 1:
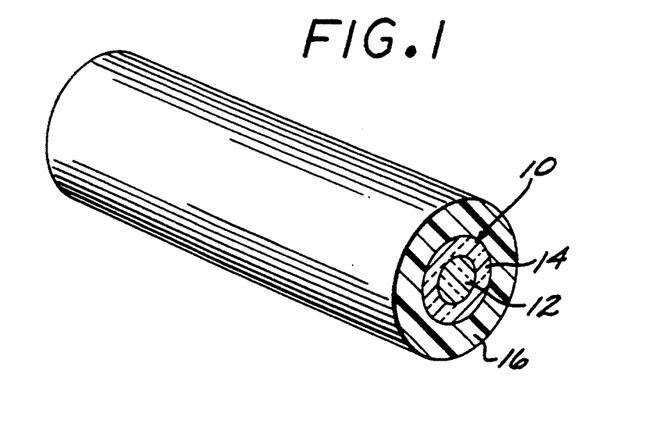
FIG. 1 is a perspective view of an optical fiber.

FIG. 1 depicts a generally cylindrical optical fiber 10, having a core 12 of a glass of a selected refractive index and a casing 14 of a glass having a slightly lower refractive index. The glass used in the core 12 and the casing 14 are of slightly different compositions, and are in most cases silicon dioxide-based glasses. A buffer coating 16 of a polymer material such as a UV curable acrylate surrounds the optical fiber 10. By way of illustration and not limitation, for a typical fiber the cylindrical diameter of the optical fiber 10 (that is, the outer diameter of the casing 14) is about 0.002–0.005 inches, and the cylindrical diameter of the buffer coating is about twice that of the optical fiber 10, or about 0.004–0.010 inches. The preferred embodiment of the present invention deals with splicing two of such optical fibers 10 in an end-to-end manner, and not the particular structure or materials of construction of the optical fibers and buffer coating, and is not so limited.

Figure 2:
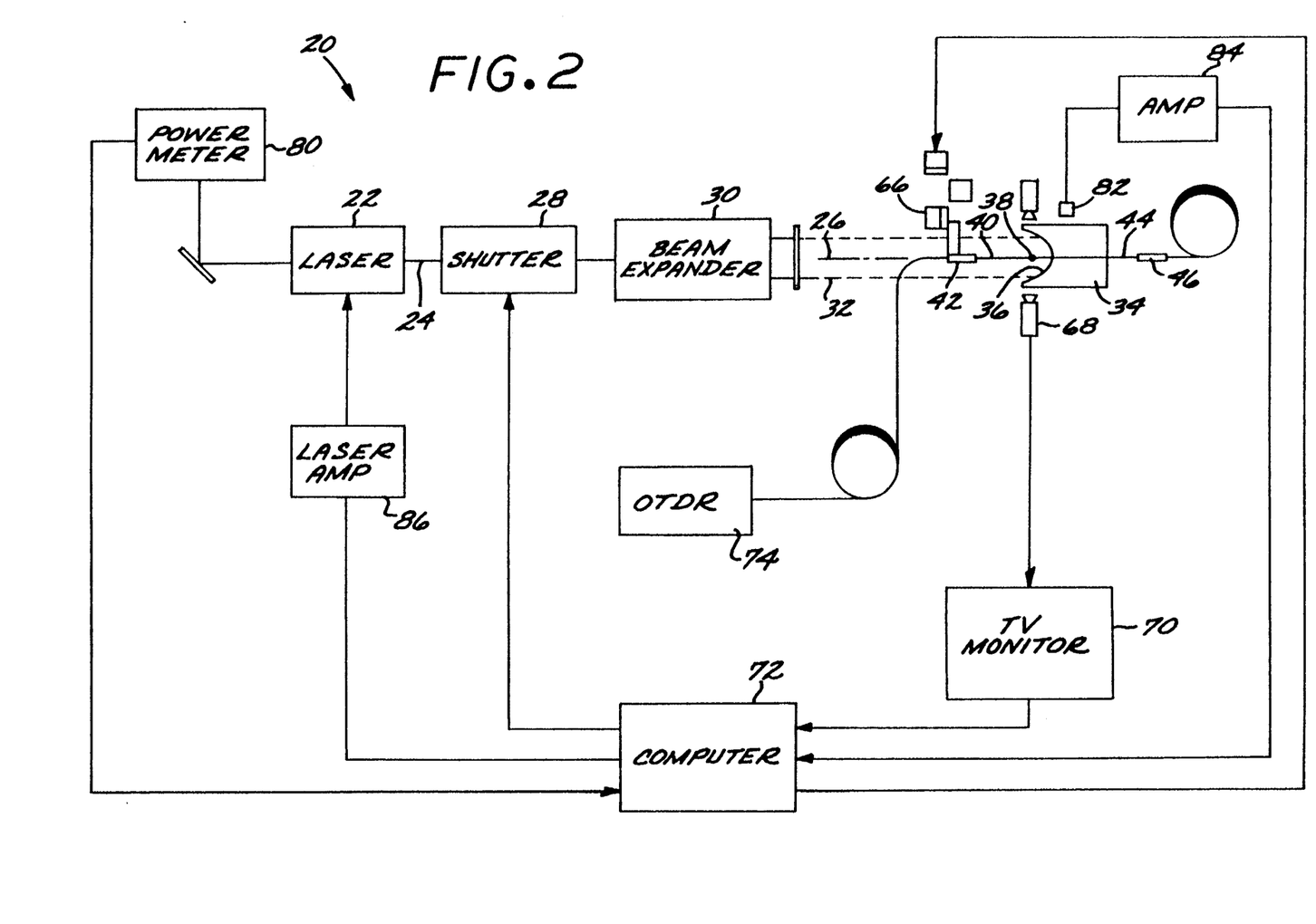
FIG. 2 is a schematic block diagram of the optical fiber splicing apparatus.

FIG. 2 depicts a laser fusion apparatus 20. A laser 22, preferably a carbon dioxide laser, produces a laser beam 24 directed along a beam axis 26. The laser beam 24 first passes through a controllable shutter 28 and then through a beam expander 30 that produces an output laser beam 32 coaxial with the beam axis 26 but of expanded diameter as compared with the laser beam 24.

Figure 3:
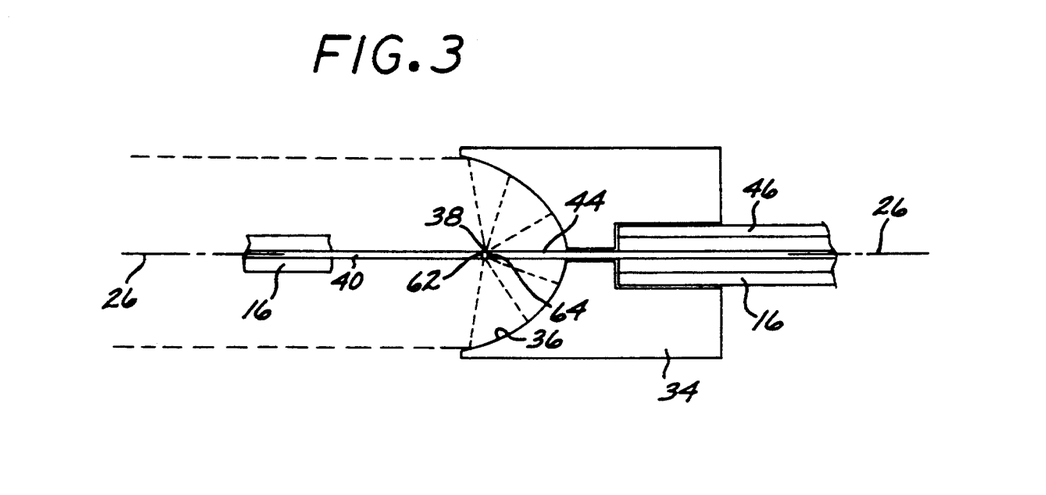
FIG. 3 is a side sectional view of the parabolic mirror with optical fiber lengths in position for splicing.

A parabolic mirror 34, depicted in greater detail in FIG. 3 and having a reflecting surface 36 which is a parabolic surface of revolution or paraboloid, is positioned so that its parabolic axis is coincident with the beam axis 26. The expanded laser beam 32 is also coincident with the beam axis 26, so that the laser beam 32 reflects from the parabolic reflecting surface 36 through a focal point 38 of the parabolic mirror 34. As depicted by the ray paths of FIG. 3, This arrangement, together with the coaxial alignment and positioning of the ends of the optical fibers during splicing, ensures circumferentially even heating of the ends of the optical fibers during the splicing operation.

A first length of optical fiber 40 to be spliced, from which the buffer layer 16 has been removed, is supported in a first clamp 42. The first clamp 42 positions the first length of optical fiber 40 between the laser 22 and the mirror 34 coincident with the beam axis 26. A second length of optical fiber 44 to be spliced, from which the buffer layer 16 has been removed, is supported in a second clamp 46. The second clamp 46 positions the second length of optical fiber 44 coincident with the beam axis 26 but further from the laser 22 than the mirror 34 along the beam axis 26. The mirror 34 has a bore 48 therethrough, coincident with the beam axis 26, of sufficient diameter so that the second length of optical fiber 44 can pass therethrough. The bore 48 preferably has two diameters, a smaller diameter near the parabolic surface through which the optical fiber 44 (with no buffer coating) slides, and a larger diameter which receives the second clamp 46, as shown in FIG. 3. Alternatively, the second clamp 46 may be supported independently of the mirror 34, as shown in FIG. 2. In the preferred embodiment, the parabolic mirror 34 is hinged along its centerline, to permit the mirror 34 to be assembled over the second length of optical fiber 44 held in the second clamp 46.

Figure 4:
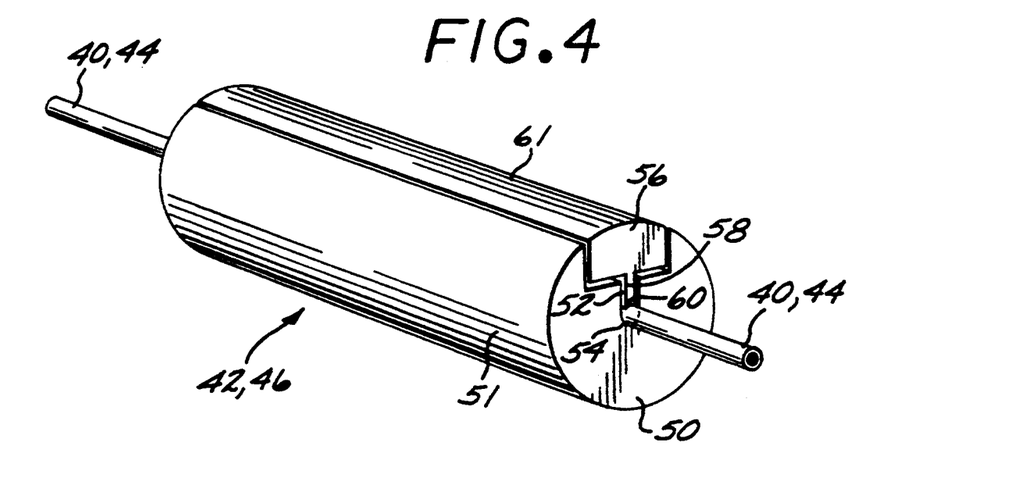
FIG. 4 is a perspective view of the optical fiber clamp holding an optical fiber.

The clamps 42 and 46 are designed to firmly but gently grasp the buffer coating around a length of optical fiber in a manner such that the optical fiber can be readily positioned along the beam axis and also moved into the proper splicing position relative to the parabolic mirror. A preferred form of the clamps 42 and 46 is shown in FIG. 4. The clamp 42, 46 includes a elongated base 50 with a cylindrical outer surface 51 and a radial slot 52 extending along the cylindrical axis of the base 50. A lower end 54 of the slot 52 is concavely curved with a radius of curvature of about that of the radius of the buffer layer 16 of the optical fiber 40, 44, and preferably just slightly larger than that of the buffer layer 16 of the optical fiber 40, 44 to be grasped in the clamp. The lower end 54 is generally concentric with the outer surface 51, and is precisely positioned relative to the outer surface 51 of the clamp.

The clamp 42, 46 further includes a retainer 56 with a tongue 58 dimensioned to closely fit within the slot 52 when the retainer 56 is assembled to the base 50 by sliding the tongue 58 into the slot 52. A lower end 60 of the tongue 58 is concavely curved with a radius of curvature about that of the optical fiber 40, 44, and preferably just slightly larger than that of the buffer of the optical fiber 40, 44 to be grasped in the clamp 42, 46. When the clamp is assembled with an optical fiber captured between the lower end 54 of the slot 52 and the lower end 60 of the tongue 58, an outer surface 61 of the retainer 56 is flush with the outer surface 51 of the base 50, so that the outer surfaces 51 and 61 cooperate to form a continuous surface that can be readily grasped. In the preferred form, the outer surfaces 51 and 61 form a generally continuous cylindrical surface when the retainer 56 is assembled to the base 50, with an optical fiber captured between the lower end 54 of the slot 52 and the lower end 60 of the tongue 58.

To grasp an optical fiber 40, 44 in the clamp 42, 46, the retainer 56 is disassembled from the base 50. The optical fiber 40, 44 is placed into the slot 52. The retainer 56 is then assembled to the base 50 by sliding the tongue 58 into the slot 52. The tongue 58 slides downwardly until the lower end 60 of the tongue 58 contacts the buffer of the optical fiber 40, 44, forcing it downwardly to contact the lower end 54 of the slot 52. The optical fiber is thereby held firmly but gently so that it may be positioned as required, in this case along the beam axis. The cooperation between the lower ends 54 and 60 holds the optical fiber at a precisely known position relative to the outer surfaces 51 and 61, permitting the optical fiber to be precisely positioned relative to the outer surfaces 51 and 61. The clamping force may be controlled by adjusting the pressure against the surface 61 of the retainer 56.

The clamp of the present approach offers important advantages over prior clamping techniques for optical fibers such as grooved blocks and magnetic chucks. The optical fiber may be precisely positioned relative to an externally grasped surface. The clamp is compact, easy to use, and does not require external connections such as a vacuum line. The absence of an external support connection is important, because such hook-ups limit the ease of movement of vacuum-type clamps. In the present clamp, the optical fiber is grasped firmly, so that it cannot move either radially or axially in the clamp. This one clamp can therefore be used for a variety of applications and situations, with the optical held securely within the clamp. The optical fiber is inserted into the clamp, and then the clamp is moved from place to place using a clamp holder to be discussed subsequently. There is little likelihood that the optical fiber will be damaged by bending, twisting, or scratching while held in the clamp.

By contrast, in prior approaches the optical fiber was typically held by different clamps at each stage of the process, each clamp being tailored for its particular stage of the process. While each of the clamps might be effective, there was a risk that the optical fiber could be damaged as it was moved from clamp to clamp between operations. This risk is avoided with the present approach, as the optical fiber is not removed from the clamps 42, 46 between splicing operations. Although these clamps 42, 46 were designed for use in the present splicing technique, they have broader use in any application where optical fibers must be grasped firmly but gently.

Returning to FIG. 3, the first length of optical fiber 40 has a first end 62 to be spliced to a second end 64 of the second length of optical fiber 44. These ends 62 and 64 lie coaxial with the beam axis 26, and are placed into a close, and preferably lightly touching, facing relationship at the focal point of the mirror 38.

To effect this positioning, the second end 64 is moved to the proper position at the focal point 38 by manually sliding it along the bore 50. The mirror 34 and the second optical fiber 44 are thereafter held stationary.

The first clamp 42 holding the first optical fiber 40 is mounted on a three-axis remotely programmable and controllable stage 66. The stage 66 permits precisely controllable movement of the first clamp 42 and thence the first end 62 of the first optical fiber 40 in the two dimensions perpendicular to the beam axis 26, so that the first optical fiber 40 can be positioned exactly coincident with the beam axis 26. The stage 66 also permits precisely controllable movement of the first clamp 42 and thence the first end 62 of the first optical fiber 40 toward the mirror 34 or away from the mirror 34 in the direction parallel to the beam axis 26, to bring the first end 62 to the focal point 38 of the mirror 34.

Two monitoring aids are used to precisely position the first end 62 relative to the second end 64. In the first, the region of the focal point 38, with the first end 62 on one side and the second end 64 on the other, is monitored by a TV camera 68. The image is viewed in a television monitor 70. The image is also provided to a microprocessor-based controller 72 operating the stage 66. Using the microprocessor in the controller 72, the image of the two ends 62 and 64 and the peripheries of the optical fibers 40 and 44 may be automatically analyzed using conventional pattern recognition techniques so that the peripheries of the optical fiber are identified. The controller 72 automatically aligns the peripheries so that the outer boundaries of the optical fibers 40 and 44 are precisely aligned along the beam axis 26.

In the second monitoring aid, light transmission through the core 12 of the optical fiber 10 is monitored using an optical time domain reflectometer (OTDR) 74. The OTDR transmits light through one of the optical fibers 40 and 44, and measures the intensity of light reflected from defects that may be present in the optical fiber. The OTDR preferably is used with the shorter of the optical fibers 40 or 44, to maximize the intensity of the reflected light for analysis, but may be used with the longer of the optical fibers or both optical fibers. Other optical monitoring aids may also be used in place of the OTDR, such as a power meter that measures the total light throughput of an optical fiber or a local light injection apparatus that measures the light transmission through a segment of the length of the optical fiber.

The use of the OTDR in characterizing and aligning the optical fibers has several important advantages. First, it permits identification, location, and characterization of the optical defects in the optical fiber, including those at the end to be spliced. Second, it permits the optical fiber cores 12 to be aligned for the splice, as distinct from the peripheries of the optical fibers. In some instances, the cores of optical fibers are not perfectly concentric with the outer peripheries of the casings 14. In those cases, if the visual alignment technique using a television image is used, the optical fiber peripheries will be aligned, but the light-transmitting cores will not be aligned.

The availability of both the visual and OTDR alignment procedures allows the user of the optical fiber considerable flexibility in selection of the result of the splicing operation. The two techniques are first used for screening the optical fibers. The controller determines the position of the stage 66 for the alignment by each of the two monitoring procedures. If the positions are different by more than some preselected amount, it may be concluded that the core is too non-concentric with the cladding. The optical fiber can then be used for some other, less demanding application.

After an acceptable optical fiber is found, one or the other of the alignment procedures is used. If the visual alignment procedure is used, the resulting spliced optical fiber will have maximum physical strength, but may not have maximum optical light transmission because the cores were not perfectly aligned. Conversely, if the OTDR procedure is used, the resulting spliced optical fiber will have maximum light transmission, but may not have maximum strength because the peripheries were not perfectly aligned. The choice of maximum strength, maximum light transmission, or unacceptability of one or both of the optical fibers is achieved automatically according to these procedures and the instructions of the operator.

Once the first end 62 and second end 64 of the optical fiber lengths are positioned in facing contact at the focal point 38 according to these principles, a pulse of laser energy from the laser 22 is directed to the focal point 38 by opening the shutter 28 for a predetermined period of time.

The pulse of laser energy is adjusted to have the minimum power required to successfully melt and fuse the ends 62 and 64 together. The use of a minimum power reduces distortion of the glass optical cores of the optical fibers, and avoids production of melt debris that can distort the optical properties of the optical fibers and also weaken them. In some prior art approaches, gas flame or electric arc heating was used to splice optical fibers. These heating techniques both are inherently difficult to control and also can introduce contaminants into the fused glass. The use of the laser to heat the optical fibers for splicing was an important advance, but too high a laser power level can cause the vaporization and ejection of silica from the optical fibers. These silica particles redeposit onto the optical fiber as flaws that can reduce the strength of the optical fiber. Minimization of the laser power minimizes such damage during splicing. The minimization cannot be reproducibly achieved without evenly heating the optical fibers around their circumference, and positioning the optical fiber ends in a reproducible manner, as provided by the present approach.

To determine the proper laser power required and also the laser power settings and shutter opening duration, calibration tests are performed to splice optical fibers similar to those that will be spliced in production. The power produced by the laser 22 is measured by a meter 80 operating through a port in the laser. Such measurement capability is routinely provided in commercial lasers. The power level measured by the meter 80 is provided to the controller 72.

The power reaching the focal point 38 during the splicing operation is also measured. This measurement is more difficult to obtain. A light intensity sensor 82 is positioned to view the ends 62 and 64 at the focal point 38 during the splicing event. The intensity of the light is detected by the sensor 82, and the output of the sensor 82 is amplified by an amplifier 84 and provided to the controller 72. It will be appreciated that the light intensity is not a direct measure of power, but is a power-dependent parameter that can serve as the basis for the control of the laser source power settings. Thus, during the calibration testing the relative positioning of the optical fiber ends 62 and 64 is determined from the visual image on the monitor 70 and correlated with the position of the stage 66 using the image processing capability of the controller 72. The laser power applied to the ends during splicing is measured both as laser output power and as the emitted light from the region of the splice.

The optical fibers spliced together during calibration are evaluated as to their mechanical and optical properties, and from the correlation with the measured splicing parameters an optimal set of splicing parameters is selected. The splicing parameters include both the positioning and the power information measured during splicing. With the reproducibility afforded by the use of the microcomputer-based controller 72, these conditions can be reproduced by controlling the positioning of the stage 66 and the power applied to the laser 22 through a laser amplifier 86, both of which are established by the controller 72.

After the ends of the optical fibers 40 and 44 are spliced, the bare length of spliced glass must be recoated with buffer material and cured. In the past, it has been common practice to remove the spliced length from the splicing apparatus (of different type than that of the present invention) and to gently move it to a coating apparatus. It has now been found that, no matter how gently this movement is accomplished, the bend or twist stressing of the optical fiber along the bare, uncoated length can lead to imperfections and possible premature later failure in some instances.

Figure 5:
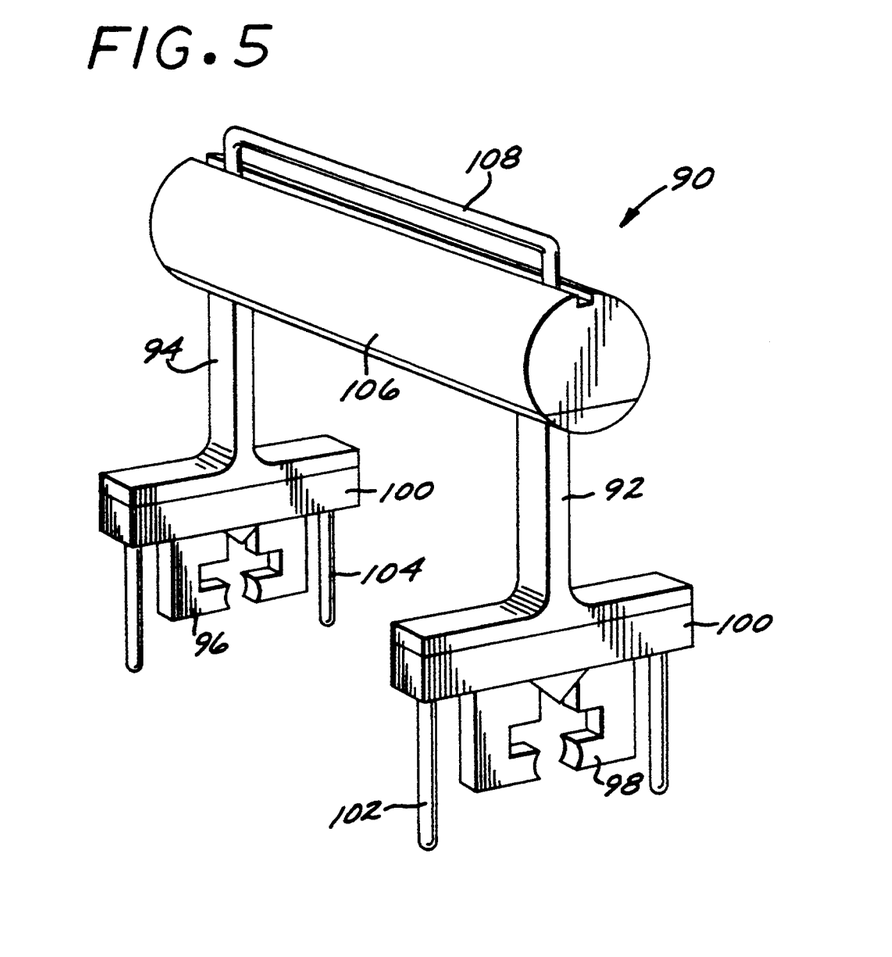
FIG. 5 is a perspective view of the optical fiber clamp holder.

To avoid this bending or twisting of the spliced optical fiber during movement from the laser splicing apparatus to the recoating apparatus, a clamp holder 90, shown in FIG. 5, has been designed. The clamp holder 90 includes two grasping arms 92 and 94. These arms 92 and 94 are spaced apart the proper distance to grasp the two clamps 42 and 46, respectively, in their normal position in the apparatus 20. The clamps 42 and 46, with the now-spliced optical fibers 40 and 42 in place within the clamps, are grasped by the arms 92 and 94 and moved as a unit to the recoating apparatus.

Each of the arms 92 and 94 includes a respective facing pair of grasping blocks 96 and 98 that are pivotably mounted to a grasping block base 100. A spring (not shown) biases the two blocks 96 and 98 of each pair toward each other. The grasping blocks 96 and 98 are dimensioned to firmly grasp the sides of the clamps 42 and 44. Respective downwardly extending locating pins 102 and 104 are also mounted from each of the bases 100. The purpose of these locating pins will be discussed subsequently.

The arms 92 and 94 are supported from a handle 106. A movable handle grip 108 operates a linkage extending inside each arm to the grasping blocks 96 and 98. When the handle grip 108 is operated, the grasping blocks 96 and 98 are pivoted apart against the spring biasing force so that the arms can be lowered over the clamps 42 and 46. When the handle grip 108 is released, the grasping blocks again pivot closed, capturing the clamps 42 and 46. The clamps 42 and 46, together with the spliced optical fiber lengths 40 and 44, are then moved as a single rigid unit that does not bend or twist the optical fiber lengths 40 and 44 during transport. On the other hand, in some cases it may be desirable to prestress the optical fibers 40 and 44 in tension during recoating, and the clamps 42 and 46 and clamp holder 90 permit the application of a controllable pretensioning. The clamps 42 and 46 are released by the inverse operation of the handle grip. The clamp holder 90 was developed specifically for use in the splicing operation discussed herein, but can also be used for other operations involving movement of precisely positioned and/or aligned optical fibers and optical fiber devices.

Figure 6:
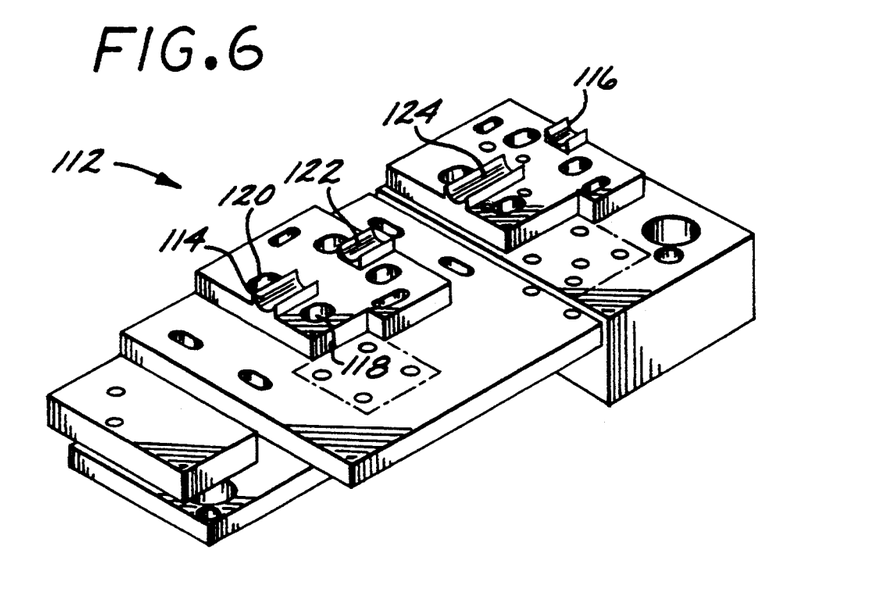
FIG. 6 is a perspective view of the recoating apparatus.

Recoating of the optical fiber is accomplished with an apparatus 112 illustrated in FIG. 6. The clamps 42, 46 rest in cradles 114 and 116, respectively. Positioning of the clamps into the cradles is aided by locating the pins 102 and 104 of the clamp holder 90 into locating slots 118 and 120 of the apparatus 112.

Figure 7:
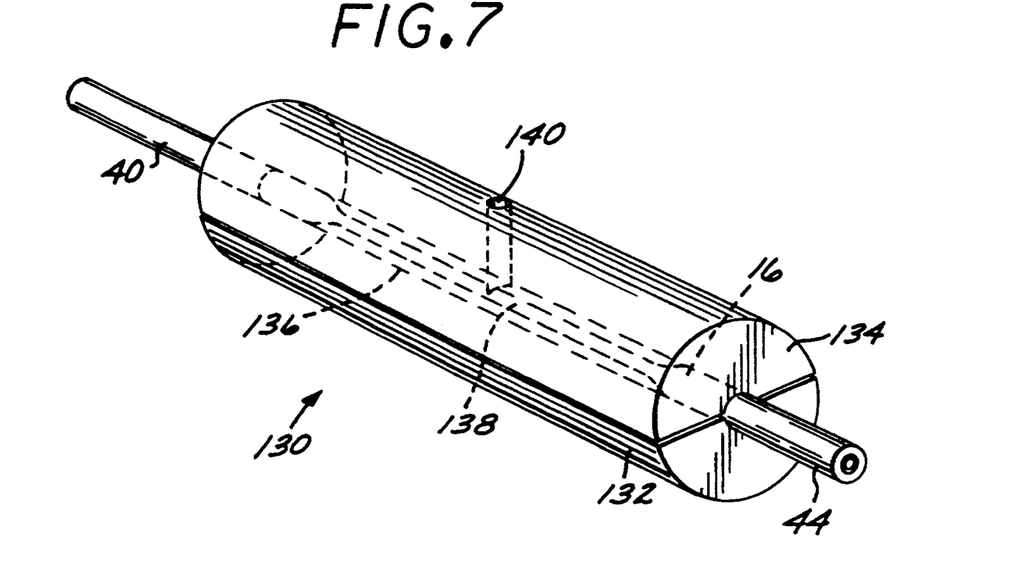
FIG. 7 is a perspective view of a split mold for recoating the optical fiber with buffer material, with interior features in phantom lines.

Once the clamps 42 and 46, and thence the optical fiber lengths are positioned, the optical fiber is recoated with a buffer layer in the regions between the previously unstripped coating material, so that the region of the splice is fully protected against scratching. A split mold 130 suitable for casting a flowable polymer around the optical fibers 40, 44 is illustrated in FIG. 7. The mold 130, when assembled around the optical fibers 40, 44, rests on a second set of cradles 122 and 124 around the uncoated portion of the optical fiber.

The mold 130 includes a bottom 132 and a mating top 134, both made of a material transparent to ultraviolet light, such as plexiglass. The bottom 132 and top 134 have semicircular recesses therein along the facing surfaces so that, when the bottom 132 and top 134 are assembled together, a cylindrical central cavity 136 is formed. The bottom 132 and top 134 are assembled over the optical fibers 40, 44 so that the portion of the optical fibers from which the buffer layer 16 has not been removed is positioned at the ends of the mold 130 as seals. The central portion 138, from which the buffer layer 16 has been removed for the laser splicing operation, lies within the interior of the cavity 136. External access to the interior of the cavity 136 is provided through a port 140.

To perform the buffer recoating, a layer of a release agent such as polytetrafluoroethylene (teflon) may be sprayed on the matching faces of the bottom 132 and top 134. The bottom 132 of the mold 130 is placed onto its cradle 122 or 124. The clamps 42 and 46 are placed into their cradles 114 and 116, respectively, so that the central portion 138 lies within the cavity 136 of the as-yet open mold. The remainder of the cavity 136 is filled by injection through a side port 140 with the flowable, ultraviolet curable polymer that polymerizes to become the buffer coating, in this case a UV curable acrylate. The polymer is cured by directing ultraviolet light of wavelength appropriate to the polymer into the previously uncured polymer, through the transparent walls of the plexiglass mold. The preferred ultraviolet light source is a mercury lamp with a strong UV output at about 350 nanometers wavelength, and curing is accomplished in a total of about 10 seconds.

The spliced and recoated optical fiber is removed from the recoating apparatus 112 and the clamps 42 and 46 and inspected. In a typical instance, the spliced region will be indistinguishable from the remainder of the length of the optical fiber, except possible for a slight color difference in the buffer material.

A number of optical fibers have been spliced by this approach and measured both as to optical performance and mechanical strength, after splicing.

In a first series of tests, 12 splices of optical fiber were made. (A thirteenth splice was prepared, but it was found through use of the OTDR that the optical fiber had a serious defect well spaced from the region of the splice, and it was dropped from the study.) The 12 splices were measured to have an optical attenuation to 1.3 micrometer wavelength radiation of 0.089+/−0.089 dB.

In a second series of test, 5 splices of optical fibers were prepared. No attenuation due to the splice was measured at 1.3 micrometer wavelength.

Mechanical data for about 100 spliced optical fibers was taken by loading the spliced optical fibers to tensile failure in an Instron testing machine. The failure strengths were measured in excess of 330,000 pounds per square inch (psi), and many were in excess of 400,000 psi.

In a production test of the approach of the invention, 5 splices were made in a fully automated manner with no operator intervention. The measured attenuations at 1.3 micrometer wavelength were less than 0.3 dB for each splice, and the strengths were in excess of 300,000 psi in each case.

The present invention provides an important advance in the art of splicing optical fibers. It permits good splices to be prepared in an automated, reproducible manner that is well suited for commercial operations that are not dependent upon operator skill and patience. Although particular embodiments of the invention have been described in detail for purposes of illustration, various modifications may be made without departing from the spirit and scope of the invention. Accordingly, the invention is not to be limited except as by the appended claims.

What is claimed is:

1. An optical fiber clamp used to hold a cylindrical optical fiber having a buffer layer of a preestablished radius, comprising:
    a base having an outer clamping surface;
    a slot in the base, the slot having a lower end convexly curved to about the radius of the optical fiber and precisely located relative to the clamping surface;
    a retainer having a tongue that removably slides into the slot, the tongue having a lower end concavely curved to about the radius of the optical fiber, the retainer being dimensioned such that an outer surface of the retainer is flush with the outer clamping surface of the base when the retainer is assembled to the base with an optical fiber captured between the lower end of the slot and the lower end of the tongue.

2. The optical fiber clamp of claim 1, wherein the outer clamping surface of the base is cylindrical, and the lower end of the slot is generally concentric with a cylindrical axis of the base.

3. An optical fiber clamp holder used to precisely position a cylindrical optical fiber having a buffer layer of a preestablished radius, with respect to an optical axis, comprising:
    two grasping arms spaced apart from each other, each grasping arm having:
        a grasping block base;
        facing pair of grasping blocks pivotably mounted to said grasping block base, and
        biasing means biasing said pair of grasping blocks toward each other;
    a movable handle grip for operating a linkage extending though each grasping arm to respective pair of grasping blocks.

4. The clamp holder of claim 3 further comprising respective downwardly extending locating pins extending from each grasping block base for positioning clamps.

5. The clamp holder of claim 4 further comprising:
    a fiber;
    two optical fiber clamps holding said fiber, each fiber clamp having:
        a base having an outer clamping surface;
        a slot in the base, the slot having a lower end convexly curved to about the radius of the optical fiber and precisely located relative to the clamping surface, and
        a retainer having a tongue that removably slides into the slot, the tongue having a lower end concavely curved to about the radius of the optical fiber, the retainer being dimensioned such that an outer surface of the retainer is flush with the outer clamping surface of the base when the retainer is assembled to the base with an optical fiber captured between the lower end of the slot and the lower end of the tongue,
    said clamps being grasped between respective pairs of grasping blocks.

* * * * *